United States Patent Office 3,218,281
Patented Nov. 16, 1965

3,218,281
POLYMER EMULSIONS WITH VINYL ACETATE-POLYOXYALKYLENE COMPOUND COPOLYMER AS STABILIZER
Richard W. Rees, Wilmington, Del., assignor to Shawinigan Chemicals Limited, Montreal, Quebec, Canada, a corporation of Canada
No Drawing. Filed Sept. 22, 1958, Ser. No. 762,262
12 Claims. (Cl. 260—29.6)

This invention relates to stable emulsions of polymers which emulsions contain as emulsifying agent a copolymer of vinyl acetate and a polyoxyalkylene compound, and to the processes for preparing said emulsions.

It has previously been found possible to prepare copolymers of vinyl acetate and polyoxyalkylene compounds for example as described by Leo M. Germain in U.S.P. 3,033,841. It has now been found that those vinyl acetate-polyoxyalkylene compound copolymers and their derivataives which are soluble in water posses useful emulsifying properties, and can be used in the prepartion of resin emulsions which form water-insensitive films.

The invention therefore consists in a process for the preparation of stable aqueous emulsions of polymers which comprises (1) dissolving in water a water-soluble emulsifying agent of the group consisting of copolymers of vinyl acetate and a polyoxyalkylene compound and hydrolyzed derivatives of said copolymers, (2) adding a polymerizable monomer selected from the group comprising styrene, the vinyl esters of the lower alkanoic acids, the lower alkyl esters of acrylic acid and the lower alkyl esters of methacrylic acid and polymerizable mixtures thereof, (3) stirring to emulsify said monomer in the aqueous medium, (4) adding to the resultant emulsion a material which is effective as an emulsion polymerization catalyst for said monomer at a temperature between 20° C. and the reflux temperature of the emulsion, and (5) subjecting the emulsion to polymerizing temperatures in the range between 20° C. and the reflux temperature of the polymerizing emulsion, the total weight of monomer added being between 30% and 60% of the weight of the emulsion and the total weight of the vinyl acetate-polyoxyalkylene compound copolymer being between 5% and 25% of the weight of said monomer, whereby a stable aqueous emulsion of the polymer is formed.

The water-soluble copolymers of vinyl acetate and polyoxyalkylene compounds are found to be effective emulsifiers and stabilizers for emulsion polymerization of styrene, the vinyl esters of the lower alkanoic acids, and the lower alkyl esters of acrylic and methacrylic acids. Lower alkanoic acids may be defined as those alkanoic acids which contain from one to eight carbon atoms; examples of vinyl esters of such acids are vinyl acetate, vinyl butyrate and vinyl 2-ethyl-hexoate; halogen derivatives, such as vinyl chloroacetate, can be polymerized in emulsion similarly. Lower alkyl esters may be defined as those which contain from one to eight carbon atoms in the alcohol portion of the ester molecule. Copolymer emulsions, such as copolymers of vinyl acetate and methyl methacrylate, similarly can be stabilized by suitable vinyl acetate-polyoxyalkylene derivative copolymers.

The polyoxyalkylene compounds of this invention include the polymer derivatives of ethylene oxide, propylene oxide, and butylene oxides. With polyoxyethylene copolymers, as the ratio of vinyl acetate to polyoxyethylene compound in the copolymer increases, the copolymers formed tend to be less water-soluble. With higher molecular weights of polyoxyethylene compounds, higher proportions of vinyl acetate can be utilized to form water-soluble copolymers. For example, one part polyoxyethylene compound of molecular weight about 400 forms a water-insoluble copolymer with one part vinyl acetate, whereas one part of a polyoxyethylene compound with molecular weight about 4000 can form a water-soluble copolymer with 3 parts vinyl acetate. Preferred proportions by weight of vinyl acetate to polyoxyethylene compound are between 3 to 1 and 1 to 20.

The usual emulsion polymerization temperatures can be employed when vinyl acetate-polyoxyalkylene compound copolymers are used as emulsifying agents. However, it is necessary for the emulsifying agent to remain soluble in the reaction mixture at the temperatures at which the polymerization reaction is to be conducted. Particularly effective results are obtained when the vinyl acetate-polyoxyalkylene compound copolymer emulsifier has been extracted by boiling water, to ensure that the emulsifier employed will be substantially soluble in water from ordinary room temperatures up to 100° C. It will be readily understood that if the emulsifying agent partially precipitates due to insolubility at the polymerization temperature, the polymer emulsion may coagulate due to lack of sufficient emulsifying agent in solution.

Polyoxypropylene compounds with molecular weights above 1000 tend to be insoluble in water, and their copolymers with vinyl acetate are similarly water-insoluble. Those polyoxyalkylene compound-vinyl acetate copolymers which are insoluble in water can often be rendered suitably water-soluble by hydrolysis of at least a portion of the acetate groups to hydroxyl groups. Such at least partially hydrolyzed copolymers which are suitably water-soluble can be used as effective emulsifying agents for polymer emulsions.

In the preparation of a stable resin emulsion, the amount of vinyl acetate-polyoxyalkylene compound copolymer which is effective to stabilize said resin emulsion is usually between 5% and 25% of the weight of the resin. It will be understood that it is usually undesirable for economic reasons to use an amount of emulsifier that is greatly in excess of the amount that is required to stabilize the emulsion effectively. It is sometimes advisable to utilize a minor amount of an additional material in the form of a wetting agent which assists in the emulsification of liquid monomer in aqueous medium.

The vinyl acetate-polyoxyalkylene compound copolymers can be used in the presence of the usual catalysts used in the preparation of polymer emulsions, including reduction-activated catalysts and redox catalysts.

Emulsion polymerization procedures well-known in the art can be employed in the preparation of polymer emulsions in which a vinyl acetate-polyoxyalkylene compound copolymer is employed as an emulsifying agent. The total quantity of the emulsifying agent can be added to the reaction vessel before the polymerization reaction begins, or optionally, only a portion may be included in the initial reaction charge and the remainder added gradually as an aqueous solution during the course of the polymerization. Similarly, the monomer to be polymerized can be added in toto before polymerization is initiated, or optionally, a portion may be added at the beginning and the remainder added at a rate to be determined by some variable, such as the temperature of the reaction or the rate of reflux of unreacted monomer. Likewise the catalyst solution can be added in a manner most conducive to the desired results; with catalyst systems consisting of two or more components, one or all of such components can similarly be added either at the beginning or gradually during the polymerization reaction.

When the polymerization reaction is substantially complete, it is generally desirable to remove the small quantities or traces of unreacted monomer which remain in the reaction mixture, especially when the presence of such monomer might have an adverse effect on the properties of films prepared from such emulsions. Such unreacted monomer may be removed by any of the conventional methods, such as by distillation, blowing with air, or other suitable method.

Films formed from resin emulsions containing the water-solube vinyl acetate-polyoxyalkylene compound copolymers as emulfyising agents exhibit unexpectedly good resistance to water-spotting and have good scrub resistance. These resin emulsions are particularly useful in paint and coating formulations, and as adhesives.

The following examples illustrate the invention, which is defined by the claims:

Example 1

This example describes the preparation of an emulsifying agent with optimum properties.

The reaction vessel was a two-liter glass flask having three necks fitted respectively with a reflux condenser with thermometer, a slow-speed stirrer with seal, and a separatory funnel with stopcock to permit delayed addition of monomer. The body of the flask was immersed in a water bath. The reactants were:

| | Grams |
|---|---|
| "Carbowax 4000" | 500 |
| Vinyl acetate | 500 |
| Benzoyl peroxide | [1] 2.5 |

[1] Dissolved in the vinyl acetate.

"Carbowax" is a registered trademark for polyoxyethylene glycols. The number (for example, 4000) following the trademark indicates the approximate average molecular weight of the particular polyglycol ("Glycols," by Curme and Johnston, 1952, Reinhold, New York, page 177).

"The "Carbowax" was placed in the flask and heated to 75° C. The whole of the vinyl acetate containing the dissolved benzoyl peroxide was added slowly ("delayed addition") with slow stirring to the molten "Carbowax," over a period of 3.5 hours, while the reacting mixture was held at its reflux temperature. The temperature was then raised to 90° C. and held for 0.5 hour to reduce residual monomer, after which a current of air was passed over the surface of the crude product to promote cooling. The crude product was a solid having about the consistency of beeswax at room temperature and was a clear viscous liquid at 100° C., amounting to 993 grams. The crude product (Emulsifier "A") was used as the sole emulsifying agent in preparing the polymer emulsions of Examples 3, 4, 6 and 7.

One hundred grams of the crude product was extracted with boiling water in a Soxhlet extractor over a 72 hour period. The fraction soluble in boiling water weighed about 75 grams. A portion of this fraction was employed as the emulsifying agent (Emulsifier "B") in Example 2.

Example 2

A stable polyvinyl acetate emulsion was prepared with the boiling-water soluble emulsifying agent prepared in Example 1, using the following ingredients:

Item No.:
1. Water _____ml__ 267.0
2. Santomerse 3 (75% active paste)_grams__ 2.8
3. Emulsifier "B" _____do____ 5.44
4. Sodium bicarbonte _____do____ 1.0
5. Potassium persulfate _____do____ 0.8
6. Emulsifier "B" _____do____ 21.8
7. Water _____ml__ 78.0
8. Vinyl acetate monomer _____ml__ 425
9. Potassium persulfate _____grams__ 0.15
10. Water _____ml__ 4.0

Santomerse 3 is an alkyl aryl sodium sulfonate supplied by Monsanto Chemical Company.

The reaction kettle was a one-liter glass container with straight sides and rounded bottom, with screw threads at the top. A stainless steel cover with corresponding threads and gasket made a gas-tight joint with the glass. The cover contained five openings, utilized as follows: (1) stirrer; (2) reflux condenser; (3) thermometer; (4) separatory funnel with stopcock or valve for delayed addition of monomer; (5) funnel with valve for addition of emulsifying agent or catalyst solution. A water bath was available for heating or cooling the kettle when desired.

The first four ingredients were charged to the kettle and the temperature was raised to 60° C. with stirring at 240 r.p.m.; 4 ml. of the vinyl acetate monomer and Item No. 5 were added, and heating continued. At 70° C. the remainder of the vinyl acetate was added at such a rate that there was no reflux; the rate of addition was very slow at first, but increased gradually as polymerization progressed. The delayed solution of emulsifier (Items 6 and 7) was also begun slowly when 40 ml. of the vinyl acetate had been added, the rate of addition of emulsifier adjusted so that the additions of emulsifier solution and monomer ended at the same time. The reaction temperature was maintained at 80–85° C. and when all the monomer had been added (in 6 hours), the terminal catalyst solution (Items 9 and 10) was added over a 5-minute period. The temperature was then raised to 90° C. and maintained at that point for 15 minutes, after which the emulsion product was cooled.

The resulting emulsion had a solids content of 55%, and had excellent mechanical stability and storage stability, over a period of at least three months. The emulsion had no graininess, and had an average particle size of 0.5 micron; dried films of the emulsion were smooth and clear, with excellent water-spotting resistance.

Optionally, all of the emulsifier used in the foregoing example could have been added at the beginning, with no noticeable differences in the properties of the resultant emulsion from that obtained when part of the emulsifier is added by delayed addition. In the absence of the Santomerse 3, stable emulsions can be obtained, although with less uniformity of particle size.

Example 3

A low-solids polyvinyl acetate emulsion was prepared, using the crude emulsifier of Example 1 (Emulsifier "A" in lieu of Emulsifier "B") and 397 ml. of vinyl acetate in lieu of 425 ml., other ingredients and amounts being the same as in Example 2. Procedure was the same as in Example 2.

The resulting emulsion had a solids content of 49%, with an average particle size of 0.2 micron. The emulsion was smooth and without graininess. Films made from the emulsion were clear and had good water-spotting resistance, although less resistant that those made with the emulsion of Example 2.

Example 4

A stable polymethyl methacrylate emulsion of 45% solids content, utilizing the crude emulsifier of Example 1 and a reduction-activated catalyst system, was prepared in the apparatus of Example 2, using the following ingredients:

Item No.:
1. Water _____ml___ 270
2. Methyl methacrylate ("initial") __grams__ 60
3. Emulsifier "A" _____do___ 30
4. Potassium persulfate _____do___ 0.8
5. Water _____ml___ 30
6. Sodium formaldehyde sulfoxylate__grams__ 0.3
7. Methyl methacrylate ("delayed")___do___ 150.0

The emulsifier (Item No. 3) was dissolved in the water (Item No. 1) in the reaction kettle and the initial monomer (Item No. 2) was added, together with the sulfoxylate (Item No. 6). The kettle was warmed to 41° C. and 5 ml. of the potassium persulfate solution (items No. 4 and 5) was added. The temperature rose to 54° C. within five minutes, as polymerization progressed. The delayed addition of monomer (Item No. 7) was begun slowly, and was completed in 35 minutes, while catalyst solution (Items 4 and 5) was added when necessary to maintain the temperature at 60°–65° C. After the remainder of the catalyst solution had been added without any rise in temperature, the emulsion was cooled to room temperature.

The resulting emulsion had excellent mechanical stability and fine particle size (between 0.1 and 0.2 micron, average 0.13 micron). It was not found possible to cast a film of this latex in the conventional manner due to the hardness of the resin, but a small quantity of the emulsion (4–5 ml.) poured on a steel plate in an oven at 120° C. gave a clear resin on drying which showed no tendency to whiten when immersed in water for three hours.

*Example 5*

A polymethyl acrylate emulsion was prepared using the following formulation:

Item No.:
1. Water _____ml___ 267.0
2. Sentomerse 3 (75%) _____grams__ 5.6
3. Emulsifier "C" _____do___ 5.44
4. Sodium bicarbonate _____do___ 1.00
5. Potassium persulfate _____do___ 0.80
6. Water _____ml___ 78.0
7. Emulsifier "C" _____grams__ 21.8
8. Methyl acrylate _____ml___ 425
9. Potassium persulfate _____grams__ 0.15
10. Water _____ml___ 4.0

Emulsifier "C" was prepared from Carbowax 4000 (500 grams), vinyl acetate (500 grams) and benzoyl peroxide (3 grams). The peroxide-vinyl acetate solution was added to the molten, stirred Carbowax at 75° C. over a period of 3 hours; apparatus and other details of procedure were the same as in Example 1.

The first four ingredients of the polymethyl acrylate emulsion formulation were charged to the kettle and stirred with a peripheral speed 50 cm./sec. (about 100 r.p.m.) while the kettle was heated to 60° C. Ingredient No. 5 and 4 ml. of methyl acrylate were added, and heating continued. At 70° C. the addition of monomer was started slowly, and when 40 ml. had been added, the addition of delayed emulsifier solution (Items No. 6 and 7) was begun. After 1.5 hours the delayed additions were complete, and the terminal catalyst solution (Items No. 9 and 10) was then added slowly while the temperature was raised to 90° C. and maintained at that point for 10 minutes before cooling.

The product was a slightly grainy, low-viscosity emulsion, with a solids content (after filtering) of 42%, and an average particle size of 0.2 micron. Films from the emulsion showed a slight haze, were flexible at room temperature, and had good water spotting resistance.

*Example 6*

A polyethyl acrylate emulsion of 38% solids content was prepared with a reduction-activated catalyst, using the following ingredients:

Item No.:
1. Water _____ml___ 270
2. Ethyl acrylate (initial) _____grams__ 60
3. Emulsifier "A" _____do___ 30
4. Potassium persulfate _____do___ 0.8
5. Water _____ml___ 30.0
6. Sodium formaldehyde sulfoxylate__grams__ 0.3
7. Ethyl acrylate (delayed) _____do___ 150.0

Ingredients 1, 2, 3, 6, and 10 ml. of the catalyst solution (Items 4 and 5) were stirred together at 25° C. The temperature rose immediately to 50° C. and delayed addition of monomer and catalyst solution were started. The delayed addition was complete in 30 minutes, the temperature being 57° C., and the total amount of catalyst solution consumed was 13 ml. As addition of the remaining catalyst solution and 0.1 gram of sulfoxylate did not result in a further rise in temperature, the emulsion was cooled.

The resulting emulsion had an average particle size of 1–2 microns and excellent mechanical stability. It yielded flexible films which did not re-emulsify and which had fair water-spotting resistance.

*Example 7*

A polystyrene aqueous emulsion was prepared using the crude emulsifier of Example 1 and a redox catalyst in the following formulation:

Item No.:
1. Water _____ml__ 270
2. Styrene ("initial") _____grams__ 60
3. Emulsifier "A" _____do___ 30
4. Cumene hydroperoxide (70% solution in cumene) _____ml__ 0.3
5. Sodium formaldehyde sulfoxylate __grams__ 0.3
6. Styrene ("delayed") _____do___ 110

The emulsifier was dissolved in the water, and the initial styrene and the catalyst (Items Nos. 4 and 5) were added and stirred together at room temperature. After ten minutes the temperature was 38° C. and the addition of delayed styrene was begun. The addition of styrene was completed in one hour at which point the temperature was 48° C. Further additions of 0.2 ml. of cumene hydroperoxide and 0.1 gram of sulfoxylate were made without affecting the temperature, indicating that the polymerization reaction was complete. The emulsion was therefore allowed to cool to room temperature.

The resulting low viscosity emulsion contained 40% solids and had good mechanical stability. It was not possible to prepare strong films from the emulsion without the addition of plasticizer. The unplasticized emulsion dried to a white, brittle film at 120° C. At room temperature, a white powder was obtained.

Examples 8–10 illustrate the preparation and utilization of vinyl acetate-polyoxypropylene compound copolymers.

*Example 8*

One hundred grams of polyoxypropylene glycol "1025" (the number indicating the average molecular weight) was placed in a one-liter flask which was mounted with a reflux condenser and stirrer and immersed in a bath at 80° C. Three hundred grams of vinyl acetate containing 3 grams of benzoyl peroxide was added to the flask over a period of four hours. The vinyl acetate reacted with the polyoxypropylene glycol to 100% conversion. The product at room temperature was a colorless solid which softened on warming.

In order to convert the acetate groups of the product to alcohol groups, one hundred grams of the product was dissolved in 200 grams of CP methanol, and two grams of sodium hydroxide dissolved in 80 ml. CP methanol was added to the solution and thoroughly mixed with it. A few minutes after stirring was discontinued, the solution set to a gel. The gel was cut into pieces in a meat chopper, allowed to stand overnight, and dried in a tray dryer at 80° C. The resulting alcoholysis product was used as the emulsifier in Example 9. It is referred to conventionally as a "hydrolyzed" copolymer.

*Example 9*

The hydrolyzed polyvinyl acetate-polyoxypropylene copolymer prepared in Example 8 was employed as the emulsifying agent to prepare a stable ethyl acrylate polymer emulsion, using the following ingredients:

Item No.:
1. Water _____ml__ 270
2. Ethyl acrylate ("initial") ____ml__ 60

3. Emulsifier of Example 8 _____ grams__ 30
4. Potassium persulfate _____ do____ 0.8
5. Water _____ ml__ 30
6. Sodium formaldehyde sulfoxylate __ grams__ 0.3
7. Ethyl acrylate ("delayed") _____ ml__ 150

Ingredients 1, 2, 3, and 6, with 10 ml. of catalyst solution (ingredients 4 and 5) were stirred together at 25° C. When the temperature rose to 50° C., the addition of delayed monomer was begun. During the addition of delayed monomer, a few drops of catalyst solution were added whenever the temperature tended to decrease. Addition of delayed monomer was completed in 25 minutes, while a total of 27 ml. of the catalyst solution was consumed. The remaining 3 ml. of catalyst solution together with 0.1 gram sodium formaldehyde sulfoxylate were added to polymerize residual monomer, as a result of which the temperature rose to 71° C. The emulsion was then cooled to room temperature. The resulting emulsion had a viscosity of 8.8 poises, solids content 43%, and residual monomer 0.1%. It was smooth and stable for at least two months.

*Example 10*

Example 9 was repeated, using, in lieu of the emulsifier used in Example 9, an emulsifier prepared by reacting 100 grams polyoxypropylene glycol "1025" with 200 grams vinyl acetate containing 2 grams benzoyl peroxide, and hydrolyzing, as described in Example 8. The resulting emulsion had a viscosity of 2.4 poises, a solids content of 43.3%, and residual monomer 0.26%. The emulsion was smooth and stable at least two months.

Emulsions stabilized with hydrolyzed polyoxypropylene glycol "2025"-vinyl acetate copolymers were similarly smooth and stable, and in addition exhibited high viscosities.

Polyoxybutylene compounds similarly react with vinyl acetate, and when the ratios of reactants are selected so that the hydrolyzed product is water-soluble, such hydrolyzed products similarly can be utilized to prepare stable polymer emulsions.

What is claimed is:

1. A process for the preparation of stable aqueous emulsions of polymers which comprises (1) dissolving in water a water-soluble emulsifying agent of the group consisting of copolymers of vinyl acetate and a polyoxyalkylene glycol, and hydrolyzed derivatives of said copolymers, said hydrolyzed derivatives having been formed by hydrolyzing at least a portion of the acetoxy groups of the copolymer to hydroxyl groups, said copolymers having been formed by reacting vinyl acetate with a polyoxyalkylene glycol having a molecular weight of at least 400 to form a copolymer, under substantially anhydrous conditions, (2) adding a polymerizable monomer of the group consisting of styrene, the vinyl esters of the lower alkanoic acids, the lower alkyl esters of acrylic acid and the lower alkyl esters of methacrylic acid and polymerizable mixtures thereof, (3) stirring to emulsify said monomer in the aqueous medium, (4) adding to the resultant emulsion a material which is effective as an emulsion polymerization catalyst for said monomer at a temperature between 20° C. and the reflux temperature of the emulsion, and (5) subjecting the emulsion to polymerizing temperatures in the range between 20° C. and the reflux temperature of the polymerizing emulsion, the total weight of monomer added being between 30% and 60% of the weight of the emulsion product and the total weight of the vinyl acetate-polyoxyalkylene glycol copolymer being between 5% and 25% of the weight of said monomer, whereby a stable aqueous emulsion of the polymer is formed.

2. A process as claimed in claim 1, in which the polyoxyalkylene glycol is a polyoxyethylene glycol.

3. A process as claimed in claim 2, in which the proportions by weight of vinyl acetate to polyoxyethylene glycol in the copolymer are between 3:1 and 1:20.

4. A process as claimed in claim 3, wherein only part of the monomer is dispersed by stirring in the aqueous medium before polymerization has been initiated, and the remainder of the monomer is added and polymerized subsequent to the initiation of polymerization.

5. A process as claimed in claim 4, wherein only part of the vinyl acetate-polyoxyethylene emulsifying agent is dissolved in the aqueous medium before polymerization has been initiated, and the remainder of said emulsifying agent is added gradually during the course of the polymerization reaction.

6. A process as claimed in claim 5 in which the polymerizable monomer is vinyl acetate.

7. A process as claimed in claim 6, in which the mixture is polymerized at the refluxing temperature of the mixture.

8. A process as claimed in claim 1, in which the polymerizable monomer is methyl acrylate.

9. A process as claimed in claim 1, in which the polymerizable monomer is ethyl acrylate.

10. A process as claimed in claim 1, in which the polymerizable monomer is methyl methacrylate.

11. A process for the preparation of stable emulsions of polymers which comprises (1) dissolving in water a water-soluble emulsifying agent consisting of a copolymer of vinyl acetate and a polyoxyethylene glycol, said copolymer having been formed by (A) forming a mixture consisting essentially of monomeric vinyl acetate and polyoxyethylene glycol in proportions by weight ranging from 3 to 1 to 1 to 20, and a material which is effective as a polymerization catalyst for vinyl acetate and (B) subjecting the mixture to polymerization temperatures in the range from 60° C. to the reflux temperature of the polymerizing mixture, (2) adding a polymerizable monomer selected from the group consisting of styrene, the vinyl esters of the lower alkanoic acids, the lower alkyl esters of acrylic acid and the lower alkyl esters of methacrylic acid and polymerizable mixtures thereof, (3) stirring to emulsify said monomer in the aqueous medium, (4) adding to the resultant emulsion a material which is effective as an emulsion polymerization catalyst for said monomer at a temperature between 20° C. and the reflux temperature of the emulsion, and (5) subjecting the emulsion to polymerizing temperatures in the range between 20° C. and the reflux temperature of the polymerizing emulsion, the total weight of monomer added being between 30% and 60% of the weight of the emulsion product and the total weight of the vinyl acetate-polyoxyalkylene glycol copolymer being between 5% and 25% of the weight of said monomer, whereby a stable aqueous emulsion of the polymer is formed.

12. A composition of matter consisting essentially of an aqueous polymer emulsion containing a water-soluble vinyl acetate-polyoxyethylene glycol copolymer, said aqueous emulsion having been prepared by (1) dissolving in water a water-soluble emulsifying agent of the group consisting of copolymers of vinyl acetate and a polyoxyethylene glycol, and hydrolyzed derivatives of said copolymers, said hydrolyzed derivatives having been formed by hydrolyzing at least a portion of the acetoxy groups of the copolymer to hydroxyl groups, said copolymers having been formed by reacting vinyl acetate with a polyoxyethylene glycol having a molecular weight of at least 400 to form a copolymer, (2) adding a polymerizable monomer of the group consisting of styrene, the vinyl esters of the lower alkanoic acids, the lower alkyl esters of acrylic acid and the lower alkyl esters of methacrylic acid and polymerizable mixtures thereof, (3) stirring to emulsify said monomer in the aqueous medium, (4) adding to the resultant emulsion a material which is effective as an emulsion polymerization catalyst for said monomer at a temperature between 20° C. and the reflux temperature of the emulsion, and (5) subjecting the emulsion to polymerizing temperatures in the range between 20° C. and the reflux temperature of the polymerizing emulsion, the total weight of monomer added being between 30% and 60% of the weight of the emulsion product and the total weight of the vinyl acetate-polyoxyethylene glycol copolymer being between 5% and 25% of the weight of said monomer, whereby a stable aqueous emulsion of the polymer is formed.

References Cited by the Examiner

UNITED STATES PATENTS

| | | | |
|---|---|---|---|
| 2,211,266 | 8/1940 | Gibello | 260—89.1 |
| 2,444,396 | 6/1948 | Collins et al. | 260—29.6 |
| 2,607,761 | 8/1952 | Seymour | 260—78.5 |
| 2,828,221 | 3/1958 | McWherter et al. | 260—29.6 |
| 2,840,447 | 6/1958 | Green | 260—29.6 |
| 2,910,448 | 10/1959 | Goldberg et al. | 260—29.6 |
| 3,033,841 | 5/1962 | Germain | 260—89.1 |

MURRAY TILLMAN, *Primary Examiner.*

DANIEL ARNOLD, LEON J. BERCOVITZ, *Examiners.*